INVENTORS
HOWARD V. GROH
JAMES E. KELLY

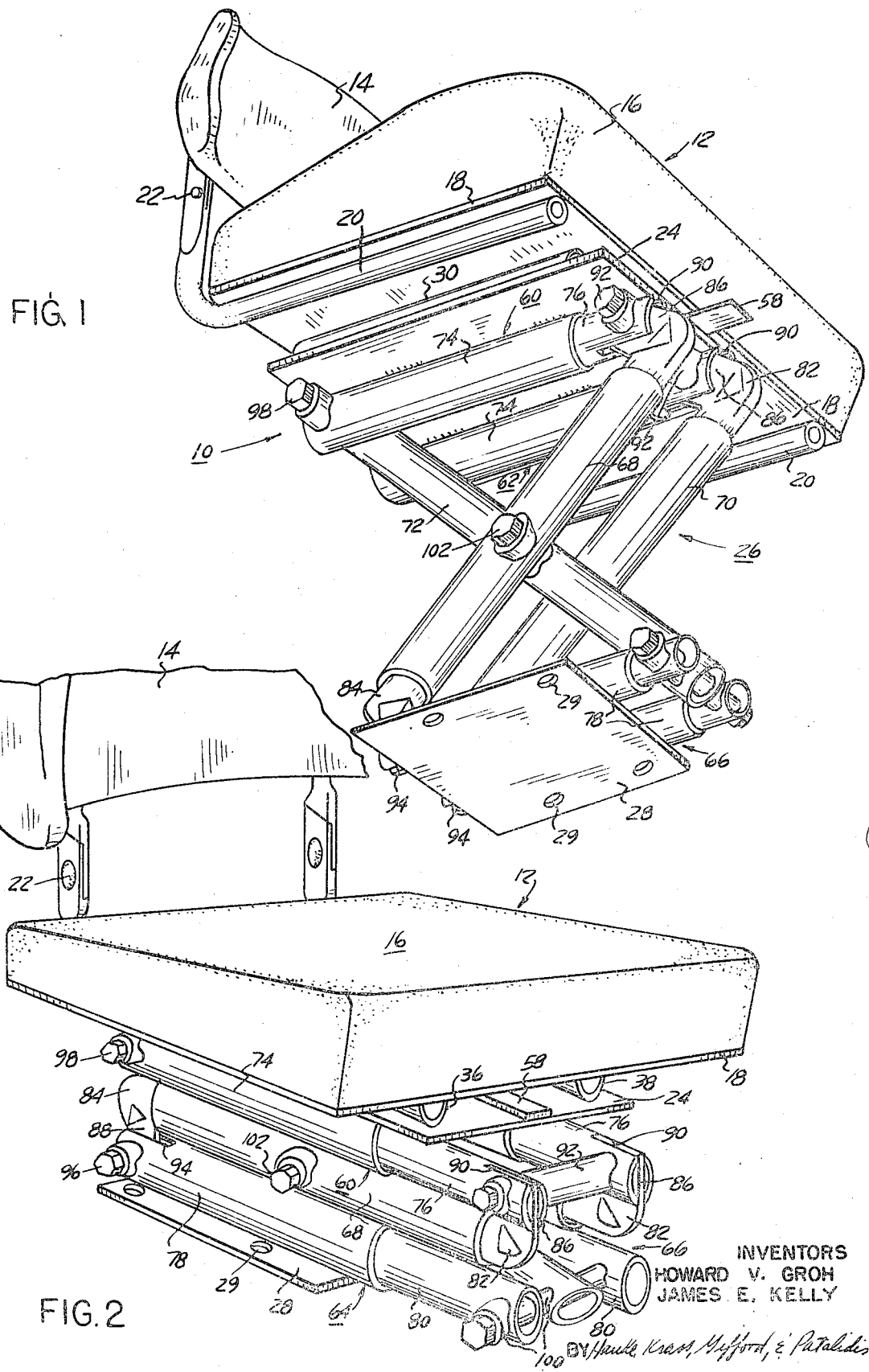

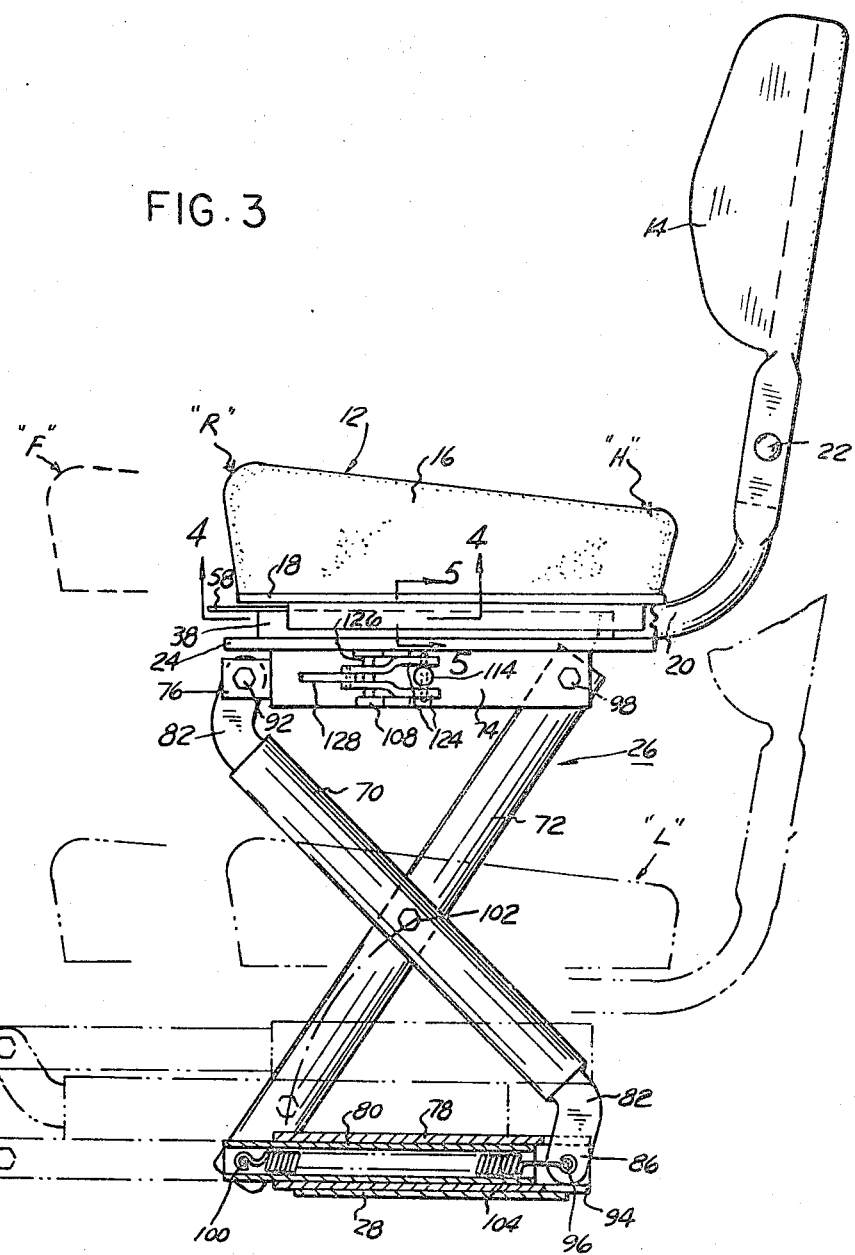
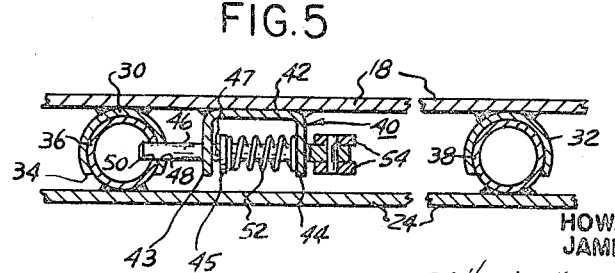

BY Hauke, Krass, Gifford, & Patalidi

ATTORNEYS

United States Patent Office 3,558,188
Patented Jan. 26, 1971

3,558,188
ADJUSTABLE SEATS
Howard V. Groh, Clawson, and James E. Kelly, Grosse Pointe Park, Mich., assignors to Craft Metal Corporation, Warren, Mich., a corporation of Michigan
Filed Oct. 14, 1968, Ser. No. 767,452
Int. Cl. A47c 3/34
U.S. Cl. 297—346                                            10 Claims

ABSTRACT OF THE DISCLOSURE

An adjustable seat for use in automotive vehicles which is supported on a collapsible and expandable pantograph-type pedestal having locking means to lock the seat in any desired expanded or collapsed position and which is further provided with a horizontal slide and lock mechanism for adjustable fore and aft movement of said seat.

BACKGROUND OF THE INVENTION

The present invention refers to automotive seat mechanisms and more particularly to a mechanically adjustable seat mechanism for a seat to be used in commercial, industrial and military type vehicles. These types of vehicles such as trucks, buses, tractors, armored vehicles, etc. usually employ a single or individual driver's seat which preferably must be universally adjustable up and down and fore and aft to suit the particular operator.

Prior to the present invention elaborate seat suspension and adjusting mechanisms have been devised to meet the above requirements. In most instances these mechanisms were power operated such as by fluid or electric motors or the like. These prior devices were expensive and subject to breakdown due to power failure.

SUMMARY OF THE INVENTION

The present invention provides novel means to resiliently and adjustably support a vehicle seat by mechanical means in which the suspension and vertical adjustment of the seat is combined in one mechanism. This is accomplished by the provision of a pantograph-type seat suspension having means embodied therein to support the seat in any vertically adjusted position. A separate horizontal slide mechanism is employed between the pantograph-type seat suspension and the seat proper for adjusting the seat in the fore and aft direction. Both of these mechanisms are provided with individual locking means to lock the seat in adjusted position at predetermined locations.

Accordingly, the primary object of the present invention resides in the provision of a novel seat adjusting mechanism for automotive vehicles comprising a pantograph-type seat support to support said seat in any one of a multiplicty of vertically adjusted positions.

Another object of the present invention is the provision of an adjustable seat having individual vertical and horizontal adjustment means and individual means to lock said seat in any chosen vertical or horizontal position.

A further object of the present invention is to provide a pantograph-type seat adjusting mechanism comprising collapsible links pivotally connected to each other and to the seat and embodying means to resiliently counterbalance the weight of the seat and seat mechanism.

Further objects and novel features will become apparent from the following detailed description in connection with the accompanying drawings illustrating a preferred embodiment of the present invention.

BRIEF DESCRIPTION OF THE DRAWINGS

FIG. 1 is a perspective illustration of the present novel seat adjusting mechanism as seen from the bottom of the seat;

FIG. 2 is another perspective view of the seat in FIG. 1, from a different angle showing the seat in the lowermost collapsed position;

FIG. 3 is a side view of the seat in FIG. 1, seen in the uppermost expanded position with alternate positions being indicated in phantom lines;

FIG. 5 is a partial cross section through the bottom portion of the seat mechanism as seen along line 5—5 in FIG. 3;

DESCRIPTION OF THE PREFERRED EMBODIMENT

Figure 4:
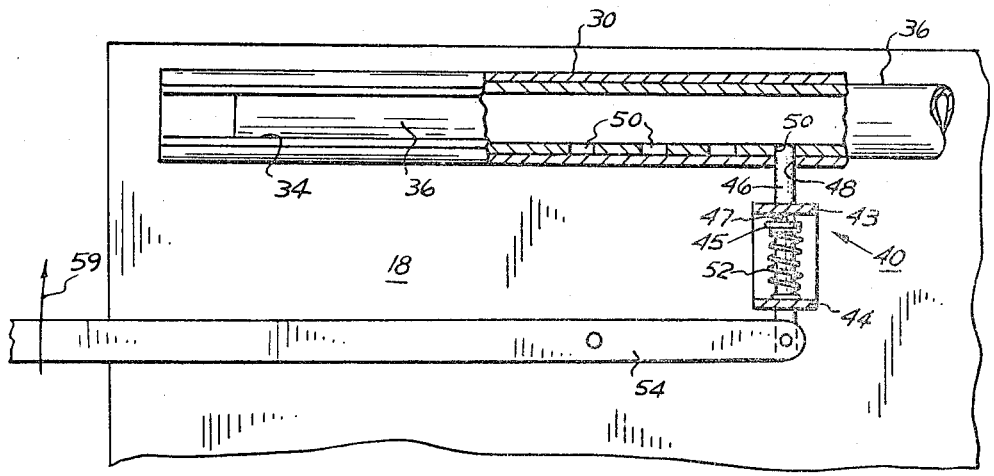
FIG. 4 is a partial plan view of the bottom portion of the seat in FIG. 3, as seen along line 3—3 thereof showing the fore and aft adjustment and locking mechanism.

With reference to FIGS. 1 and 2 the seat assembly 10 comprises in general a seating portion 12 and a seat back 14. The seating portion 12 is composed of a seat cushion 16 attached to the top of a seat support plate 18. Attached to the other side of the support plate 18 is a pair of frame rails 20 extending rearwardly and upwardly of the seat portion 12 to pivotally support the seat back 14 on a pivot pin 22.

Underneath the seating portion 12 and coplanar with the seat support plate 18 and spaced therefrom is another plate 24 which forms the upper attachment for a pantograph-type linkage support mechanism 26 disposed between the seating portion 12 and a bottom attachment plate 28. The bottom attachment plate is provided with appropriate mounting apertures 29 for mounting upon a motor vehicle floor.

With additional reference to FIGS. 3–5, attached to the underside of the seat support plate 18, as by welding or the like, there is a pair of parallel spaced tubular members 30 and 32 positioned between the frame rails 20 and parallel thereto. Each of the tubular members 30 and 32 is provided with a longitudinal slot 34 (FIG. 5) opposite the seat support plate 18 for a purpose to appear and telescopically receive each inner tubular member 36 or 38 respectively for longitudinal sliding engagement therewith. As seen in FIG. 5, the inner tubular members 36 and 38 extend laterally out of the slot 34 in the outer tubular members 30 and 32 for attachment as by welding or the like to the upper surface of the upper attachment plate 24. Thus, the seating portion 12 is horizontally movable back and forth relative to the upper attachment plate 24 by means of its attachment to the outer tubular members 30 and 32 slidable on the inner tubular members 36 and 38 between the maximum rear position R and maximum forward position F as indicated in FIG. 3. In order to secure the seating portion 12 in any desired fore or aft position between the maximums R and F, a locking mechanism 40 is provided as seen in FIGS. 4 and 5 which is attached to the underside of the seat support plate 18. The locking mechanism 40 includes an inverted U-bracket 42 attached as by welding to the underside of the seat support plate 18. A movable lock pin 46 extends transversely through the opposite side flanges 43 and 44 of the bracket 42 into an aperture 48 provided in the side of the outer tubular member 30 and in the locked position, further extends into a corresponding aperture 50 of a series of equally spaced apertures in the inner tubular member 36 when aligned therewith upon adjustment to thus securely lock the outer tubular member 30 to the inner tubular member 36 to prevent any relative motion between the seat portion 12 and the upper attachment plate 24. The lock pin 46 is normally held engaged within the aligned apertures 48 and 50 by means of a spring 52 placed around the pin 46 and confined between the side flanges 44 and a washer 45 retained on the pin by a cotter pin 47 or the like to thus bias the lock pin 46 into the apertures of the tubular members. To move the lock pin 46 out of engagement for longitudinal adjustment of the seat portion 12, the outer end of the pin is pivotally attached to one end of a lever 54 which is secured at 56 to the underside of the support plate 18 for pivoting movement relative thereto. The other end of the lever 54 extends towards and beyond the front of the seat as shown to provide a hand grip 58 by which the end of the lever may be pulled in the direction of arrow 59 to unlock the pin 46. Upon alignment of the aperture 48 with either of the apertures 50, the spring 52 forces the pin into locking engagement within the apertures.

The pantograph-type support mechanism 26 for vertical adjustment and support of the seat comprises in general— as shown in FIGS. 1 to 3—a pair of parallel upper telescoping tube assemblies 60 and 62 positioned longitudinally of the seat and a pair of parallel aligned lower telescoping tube assemblies 64 and 66 which are diagonally pivotally connected by a pair of parallel tubular links 68 and 70 and by a single tubular link 72 between the links 68 and 70 which extends in the opposite diagonal direction. The pair of upper telescoping tube assemblies 60 and 62 each comprise an outer tubular member 74 welded or otherwise secured to the underside of the upper attachment plate 24 which each slidably receives an inner tubular member 76. The pair of lower telescoping tube assemblies 64 and 66 are similarly constructed and comprise each an outer tubular member 78 attached as by welding or the like to the upper surface of the bottom plate 28 which each slidably receives an inner tubular member 80 extending in the same direction as the inner tubular members 76 of the upper pair of telescoping tube assemblies.

The pair of diagonal tubular links 68 and 70 each have a flattened upper flange member 82 and flattened lower flange member 84 suitably secured by welding or the like within the ends of the tubular links. The flange members 82 and 84 are provided each with a tongue portion 86 and 88 respectively bent away from the longitudinal axis of the tubular links in opposite direction from each other. The upper tongue portions 86 of the tubular links 68 and 70 are adapted to extend within axial slots 90 provided in each of the outer ends of the upper inner tubular members 76 to be pivotally secured thereto by means of a common pivot pin 92 thus pivotally connecting the upper inner tubular members 76 to the upper ends of the diagonal links 68, 70 at the front of the seat. The lower tongue portions 88 of the tubular links 68 and 70 are adapted to extend within axial slots 94 provided in each of the rear ends of the lower outer tubular members 78 to be likewise pivotally secured thereto by means of common pivot pin 96 thus pivotally connecting the lower outer tubular members 78 to the lower ends of the diagonal links 68 and 70 at the rear of the seat to provide a collapsible diagonal connection between the upper telescoping tube assemblies 60 and 62 and the lower telescoping tube assemblies 64 and 66.

The upper end of the single tubular diagonal line 76— which extends crosswise of the diagonal links 68, 70—is pivotally secured between the upper telescoping tube assemblies 60 and 62 at the rear of the seat by a common pivot pin 98 connecting that end of the single link to both outer tubular members 74. The lower end of the diagonal link 72 is pivotally secured between the lower telescoping tube assemblies 64 and 66 at the front of the seat by means of a common pivot pin 100 extending through the link and both outer ends of the lower inner tubular members 80 to thus provide a diagonal cross connection between the upper telescoping tube assemblies 60–62 and lower telescoping tube assemblies 64–66. The single diagonal link 72 extends between the pair of diagonal links 68 and 70 and is likewise pivotally secured thereto by a central pivot pin 102 substantially in the center of the diagonal links 68, 70 and 72. The diagonal links 68, 70 and 72 are of constant length and their length determines the maximum adjusted height position H of the seat as seen in FIGS. 1 and 3. In this position, the upper and lower inner tubular members 76 and 80 are fully retracted within their respective outer tubular members 74 and 78. Upon lowering of the seat, the diagonal links 68, 70 and 72 pivot around the central pivot 102 thereby moving the inner tubular members 76, 80 out of the outer tubular members 74 and 78. In the lowermost position L of the seat as illustrated in FIG. 2 and shown in dot and dash lines in FIG. 3, the telescoping assemblies 60 and 66 are fully extended and the diagonal links 68 and 70 are positioned parallel between the upper telescoping tube assemblies 60, 62 and lower telescoping tube assemblies 64, 66 which is made possible by the offset tongue construction of the flange members 82, 84 on the diagonal links 68, 70.

In order to provide resilient resistance to the collapse of the pantograph-type support 26, and to counterbalance the weight of the seat and of the person sitting thereon, an extension spring 104 is preferably provided in each of the telescoping tube assemblies 60, 62, 64 or 66 or in the lower telescoping tube assemblies 64 and 66 only, as for example illustrated by the cross section in FIG. 3. The opposite ends of the spring 104 are connected to the rear pivot pin 96 and the front pivot pin 100 respectively and thus the spring tends to bias the inner tubular member 80 in a direction inwardly of the outer tubular member 78 thereby providing a resistance force against outward movement of the inner tubular members when a load is placed upon the seat 12. The pantograph-type suspension 26 is thus prevented from collapsing when the lock is released and the weight is lifted from the seat. In that instance, the seat would extend towards the maximum height position by the contraction force of the springs 104 unless it is locked in position or a weight is placed on the seat 12.

Figure 6:
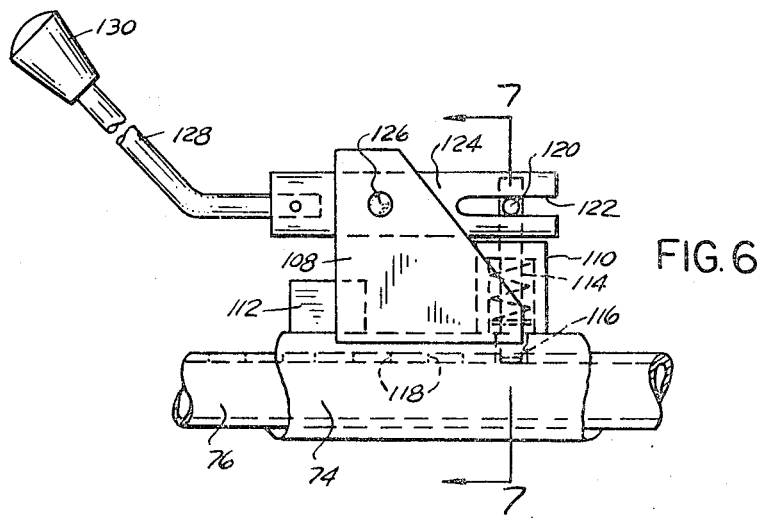
FIG. 6 is an enlarged top view of the vertical locking mechanism incorporated in the seat mechanism shown in FIG. 3.
Figure 7:
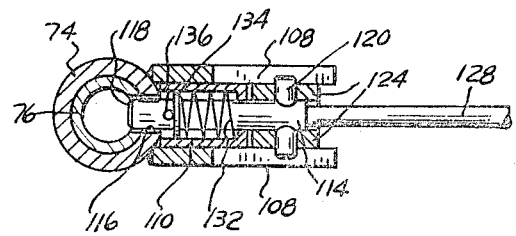
FIG. 7 is a cross section through the locking mechanism of FIG. 6 along line 7—7 thereof.

To retain the seat 12 in any desired adjusted position between the maximum height position H and the maximum low position L, a lock mechanism 106 is being provided at either the left or right hand upper telescoping tube assemblies 60 or 62. With reference to FIGS. 3, 6 and 7 this is illustrated as being located on the left hand upper telescoping tube assembly 62 although it will be understood that the lock mechanism may be located on the right hand upper telescoping tube assembly 60. The lock mechanism 106 comprises a pair of identical, spaced brackets 108 welded or otherwise secured to the side of the upper outer tubular member 74 to extend therefrom in a horizontal position parallel to the upper attachment plate 24. The brackets 108 are kept properly spaced rearwardly by a block 110 and forwardly by a block 112 welded or otherwise secured to the outer tubular member 74. The rear block 110 contains a slidable lock pin 114 extending therethrough and into an aperture 116 provided in the side of the outer tubular member 74 and further—normally— into another aligned aperture 118 of a series of equally spaced apertures provided in the side of the inner tubular member 76. The outwardly extending end of the lock pin 114 is provided with a hinge pin 120 adapted to be engaged within a slot 122 at the end of a bifurcated lever 124 which extends forwardly through the upper portion of the brackets 108 and is pivoted thereto as at 126. The lever 124 is attached to a rod 128 having a hand grip 130 for manipulation of the lever 124 to move the lock pin 114 out of engagement with the inner aperture 118 when it is desired to adjust the height of the seat 12. In that instance, when the lock pin 114 is released, the load placed on the seat 12 by the person sitting on it will normally be sufficient to hold the seat in suspension or to slowly collapse the pantograph-type support mechanism at a rate depending on the resistance force of the springs 104. Upon obtaining of a suitable seat position and alignment of the lock pin 114 with a respective aperture 118 in the inner tubular member 76, the lock pin will snap into engagement within the selected aperture 118 by means of the force of the spring 132 positioned within the block aperture 111 of the block 110 and which is compressible between the upper part of the block and a washer 134 on the lock pin 114 held by a cotter pin 136 or the like.

CONCLUSION

The present invention provides a simplified mechanical universal seat adjustment comprised of a plurality of telescoping members and non-telescoping members diagonally connected thereto which are relatively easy to assemble and inexpensive to manufacture.

The present invention may be embodied in other forms without departing from the spirit and essential characteristic thereof, therefore the present embodiment is to be considered as illustrative only and not restrictive, the scope of the invention being indicated by the appended claims rather than by the foregoing description.

We claim:

1. An adjustable seat mechanism for adjustably varying the fore and aft and height position of a seat in predetermined increments comprising:
    (a) a lower support;
    (b) an upper support overlying said lower support in spaced relationship;
    (c) a third support overlying said upper support in spaced relationship and longitudinally movable relative thereto;
    (d) a seat attached to said third support for longitudinal movement therewith;
    (e) adjustable suspension means between said lower and upper support adapted to vary the distance between said lower and upper support, said adjustable suspension means comprising identical upper and lower telescoping means attached to said upper support and said lower support respectively, and crosslinks diagonally and pivotally connecting opposite ends of said telescoping means, said crosslinks being pivotally connected to each other intermediate their ends; and
    (f) individual locking means for said movable third support and said adjustable suspension means.

2. In the adjustable seat mechanism defined in claim 1, said upper telescoping means comprising:
    (a) an outer member secured to said upper support having an aperture within its side;
    (b) an inner member slidably disposed within said outer member having a series of apertures within its sides in longitudinal alignment with said aperture in said outer member.

3. In the adjustable seat mechanism defined in claim 2, said locking means for said adjustable suspension means comprising:
    (a) a bracket secured to said outer member;
    (b) a lever pivotally attached to said bracket;
    (c) a bearing support attached to said outer member adjacent said bracket and aligned with said aperture;
    (d) a pin pivotally connected to said lever and slidably disposed within said bearing support adapted to extend within said aperture in said outer member and within a selected one of said series of apertures within said inner member upon alignment of said apertures; and
    (e) resilient means within said bearing support adapted to normally urge said pin into engagement with said apertures.

4. An adjustable height suspension unit for a seat comprising: a collapsible and extendable linkage assembly between a lower support and an upper support, said collapsible and extendable linkage assembly being composed of a first pair of longitudinal slide members attached parallel to each other in spaced relation to said lower support, a second pair of longitudinal slide members attached parallel to each other to said upper support, a pair of constant length parallel links having upper and lower end attachment flanges, said upper end attachment flanges each being pivotally connected to one end of each of said second pair of longitudinal slide members, said lower end attachment flanges each being pivotally connected to the opposite end of each of said first pair of longitudinal slide members to diagonally connect said first and said second pair of longitudinal slide members, a single link of constant length pivotally connected at one end to said second pair of longitudinal slide members opposite from said upper end attachment flanges and at the other end to said first pair of longitudinal slide members opposite from said lower end attachment flanges for opposite diagonal connection between said first and said second pair of longitudinal slide members, said single link extending between said pair of constant length links for pivotal connection thereto substantially at the center thereof, and resilient means associated with said linkage assembly to resist collapse of said linkage assembly.

5. The adjustable height suspension unit defined in claim 4, in which said first pair of longitudinal slide members comprise each an outer member and an inner member slidably disposed within said outer member for extension or contraction therein upon collapsing or extension of said linkage assembly, the outer ends of each of said outer members being slotted longitudinally to each receive one of said lower end attachment flanges of said pair of constant length links.

6. The adjustable height suspension unit defined in claim 5 in which said second pair of longitudinal slide members comprise each an outer member and an inner member slidably disposed within said outer member for extension or contraction therein upon collapse or extension of said linkage assembly, the outer ends of each of said inner members being slotted longitudinally to each receive one of said upper end attachment flanges of said pair of constant length links.

7. The adjustable height suspension unit defined in claim 6 in which said upper and said lower end attachment flanges of said pair of constant length links are curved away from the axis of said pair of links in opposite direction to assure maximum collapse of said collapsible linkage in the lowermost position of said seat.

8. In the adjustable height suspesnion unit as defined in claim 4, said first and said second pair of longitudinal slide members being comprised of pairs of telescoping tubes.

9. In the adjustable height suspension unit as defined in claim 8, said resilient means comprising springs disposed within said longitudinal slide members.

10. The adjustable height suspension unit as defined in claim 4 further comprising locking means for said collapsible and extendable linkage to lock said linkage in any one of a number of preselected height positions.

References Cited

UNITED STATES PATENTS

| | | | |
|---|---|---|---|
| 848,465 | 3/1907 | Homeyer | 297—345 |
| 1,366,274 | 1/1921 | Orth | 297—345 |
| 2,490,341 | 12/1949 | Davis | 297—346 |
| 2,836,222 | 5/1958 | Martin | 297—346 |
| 3,157,430 | 11/1964 | Hamilton | 248—399 |
| 3,189,312 | 6/1965 | Bilancia | 297—346 |

FOREIGN PATENTS

| | | | |
|---|---|---|---|
| 657,517 | 2/1963 | Canada | 297—346 |

REINALDO P. MACHADO, Primary Examiner